(12) United States Patent
King

(10) Patent No.: US 6,424,439 B1
(45) Date of Patent: Jul. 23, 2002

(54) WAVELENGTH DIVISION MULTIPLEXED CHANNEL TAGGING

(75) Inventor: Jonathan Paul King, Epping (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/198,386

(22) Filed: Nov. 24, 1998

(51) Int. Cl.[7] .......................... H04J 14/00; H04J 14/02; H04J 14/08
(52) U.S. Cl. .................. 359/124; 359/123; 359/132; 359/135
(58) Field of Search ................... 359/123, 132, 359/135, 181, 182, 183, 184, 185, 186, 124

(56) References Cited

U.S. PATENT DOCUMENTS

| | | | | |
|---|---|---|---|---|
| 5,745,270 A | * | 4/1998 | Koch | 359/124 |
| 5,892,606 A | * | 4/1999 | Fatehi et al. | 359/177 |
| 5,917,627 A | * | 6/1999 | King | 359/135 |
| 6,108,123 A | * | 8/2000 | Kinoshita | 359/337 |

* cited by examiner

*Primary Examiner*—Leslie Pascal
*Assistant Examiner*—Dalzid Singh
(74) *Attorney, Agent, or Firm*—Lee, Mann, Smith, McWilliams Sweeney & Ohlson

(57) ABSTRACT

A method of tagging individual wavelength division multiplexed channels within a plurality of said channels. The method comprises the step of creating a tagging tone in the form of an analogue spectral line tone, by providing a series of regularly spaced time slots substantially throughout each of said tagged channels for receipt of binary tagging pulses. The binary tagging pulses in each tagged channel are arranged in a different manner to provide a characteristic tag for each tagged channel.

18 Claims, 2 Drawing Sheets

WAVELENGTH DIVISION MULTIPLEXED CHANNEL TAGGING

FIELD OF THE INVENTION

The present invention relates to wavelength division multiplexed channel tagging and more particularly to a method of and apparatus for tagging channels in return to zero systems such as soliton systems.

BACKGROUND OF THE INVENTION

Channel tagging or identification is an essential part of an optical network management function in order to be able to simply track wavelength channels through various network elements such as optical cross connects, add-drop nodes and optical amplifiers. Clearly there are a number of different methods by which the individual wavelength channels can be differentiated. For example, channel tagging is commonly carried out by imposing an analogue amplitude modulation on the optical envelope of the optical channel, to identify that channel uniquely, as seen in FIG. 1. In this method of tagging the optical envelope for each channel is modulated at a different frequency. In soliton systems, or other return to zero systems, the optical pulses or solitons tend to converge to a standard amplitude, centre frequency and phase, within the bit period. Therefore, any analogue modulation imposed on the optical envelope will be removed as the optical envelope is propagated along the fibre and as such this form of conventional channel tag will be lost.

Another known method of channel tagging is to incorporate a channel identification code in a block of data between payload sections of the data, these codes being read at the channel data rate. FIG. 2 schematically illustrates a data stream incorporating a channel identification code as described above. The problem with this method of coding a channel is the fact that the identification code must be read at the data bit rate. At present it is not clear how soliton data will be formatted. However, the very high bit rates envisaged for soliton transmissions (in the order of 100 Gbits/second) would favour bit interleaving of a plurality of separate channels at a lower rate (e.g. 5 times 20 Gbps). This not only means that the channel identification code would have to be read at a very high rate, it also means that this form of frame dependent tagging scheme would have to accommodate the frame shuffling introduced by the interleaving process.

SUMMARY OF THE INVENTION

Therefore, it is an object of the present invention to provide a wavelength division multiplexed optical channel tag without utilising envelope analogue modulation techniques in accordance with the prior art.

It is a further object of the present invention to produce a wavelength division multiplexed channel tag suitable for use with return to zero systems such as soliton systems.

It is a further object of the present invention to provide a wavelength division multiplexed channel tag that is independent of any data framing or formatting system.

It is a further object of the present invention to provide a wavelength division multiplexed channel tag which may be detected utilising equipment which operates at a low frequency in comparison to the data rate of the optical channel being tagged.

It is a further object of the present invention to provide a wavelength division multiplexed channel tag which enables tagging of a channel without necessitating the determination of the wavelength of the channel being tagged.

According to a first aspect of the present invention there is provided a method of tagging individual wavelength division multiplexed channels within a plurality of said channels, comprising the step of creating a tagging tone in the form of an analogue spectral line tone, by providing a series of regularly spaced time slots substantially throughout each of said tagged channels for receipt of binary tagging pulses, the binary tagging pulses in each tagged channel being arranged in a different manner to provide a characteristic tag for each tagged channel.

Preferably, the periodicity of the tagging pulses in a tagged channel is such as to produce said analogue spectral line with a frequency at least an order of magnitude less than the data rate of data being transmitted within said channel.

More preferably, the data rate of the channel lies in the GHz range and the frequency of the spectral line lies in the MHz range.

Preferably, each channel tag is modulated so as to have a different spectral line frequency.

Alternatively, each tagged channel includes a plurality of tagging pulses, which are configured to produce a characteristic binary channel identifying code, which is readable at the analogue spectral line frequency.

Alternatively, each channel tag is modulated to have a different phase. This is possible as the tag modulation is low frequency compared to the data rate, so that the relative phase of channels should be fairly well preserved down a fibre link.

According to a second aspect of the present invention there is provided an optical transmission system comprising:
a data buffer having inputs and outputs, the inputs of which are connected to a source of a series of individual untagged electronic channels,
a light source adapted to provide wavelength division multiplexed optical signals for each of said channels, the light source being connected to the outputs of said buffer,
the data buffer being adapted to provide a data stream in respect of each channel to be tagged with a series of uniformly spaced time slots,
and modulation means adapted to apply a characteristic series of tagging pulses in selected ones of said time slots to produce a tagging tone in each of said tagged channel in the form of an analogue spectral line tone.

Preferably, the modulator interrupts the data stream in order to insert additional time slots.

Alternatively, the modulator reserves time slots by treating the tagging bits as an additional low data rate tributary which is interleaved with the payload data tributaries at the bit interleaving stage.

Preferably, the modulator is arranged to provide the tagging pulses with a periodicity such that the analogue spectral line has a frequency at least an order of magnitude less than that of the data rate of the channel.

In one embodiment the modulator is arranged to modulate each channel tag by changing the frequency of the spectral line tone.

Alternatively, the modulator is arranged to produce a characteristic binary channel identifying code, which is readable at the analogue spectral line tone frequency.

Alternatively, the modulator is arranged to modulate each channel tag by changing the phase of the analogue spectral line tone on the channel.

According to a third aspect of the present invention there is provided an optical communications system comprising:

an optical transmission system comprising: a data buffer having inputs and outputs, the inputs of which are connected to a source of a series of individual untagged electronic channels, a light source adapted to provide wavelength division multiplexed optical signals for each of said channels, the light source being connected to the outputs of said buffer, the data buffer being adapted to provide a data stream in respect of each channel to be tagged with a series of uniformly spaced time slots, and modulation means adapted to apply a characteristic series of tagging pulses in selected ones of said time slots to produce a tagging tone in each of said tagged channel in the form of an analogue spectral line tone;

a multiplexer and a demultiplexer coupled via a fibre link; and a tagging tone detector connected to said demultiplexer and adapted to distinguish individual tagging tones in order to demultiplex said tagged channels. .

Preferably, the detector includes correlation electronics adapted to distinguish individual tag identifying codes.

Alternatively, the detector is adapted to detect the analogue spectral line tone frequency of each channel tag utilising a phase locked loop detector.

Alternatively, the detector is adapted to detect the analogue spectral line frequency of each channel tag utilising a narrow band amplifier.

According to a fourth aspect of the present invention there is provided an optical wavelength division multiplexed channel management system for the management of an optical communications network transmitting a plurality of channels wherein data is transmitted using return to zero pulses, each of said channels being tagged utilising a method comprising the step of creating a tagging tone in the form of an analogue spectral line tone, by providing a series of regularly spaced time slots substantially throughout each of said tagged channels for receipt of binary tagging pulses, the binary tagging pulses in each tagged channel being arranged in a different manner to provide a characteristic tag for each tagged channel.

It is an advantage of the present invention that a method of tagging individual wavelength division multiplexed channels is provided which is independent of any data framing or formatting scheme.

BRIEF DESCRIPTION OF THE DRAWINGS

These and other objects, aspects, features and advantages of the present invention will become more apparent from the following detailed description, claims and drawings, in which:

DETAILED DESCRIPTION OF THE INVENTION

Figure 1:
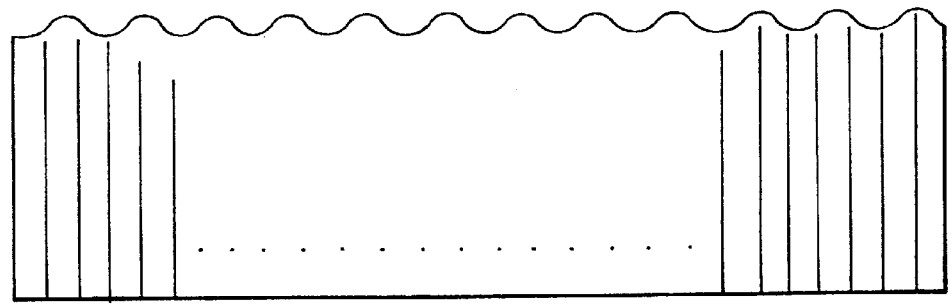
FIG. 1 is a schematic illustration of a data stream in a wavelength division multiplexed channel which is tagged utilising envelope modulation, in accordance with the prior art.
Figure 2:
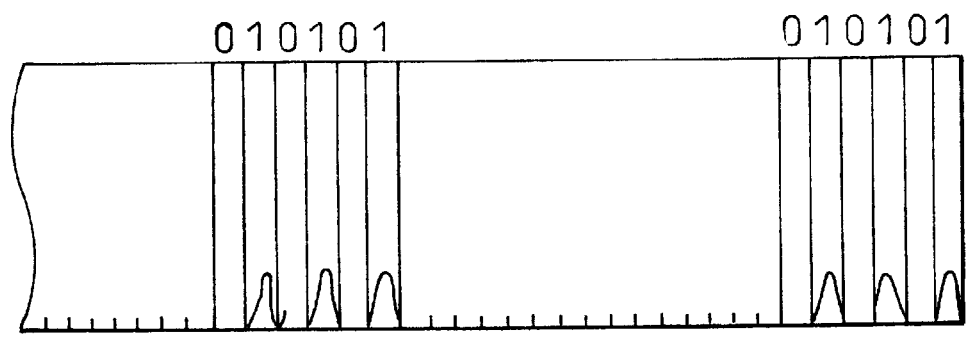
FIG. 2 is a schematic illustration of a data stream in a wavelength division multiplexed channel which is tagged utilising channel identifying codes which are read at the data bit rate, in accordance with the prior art.
Figure 3:
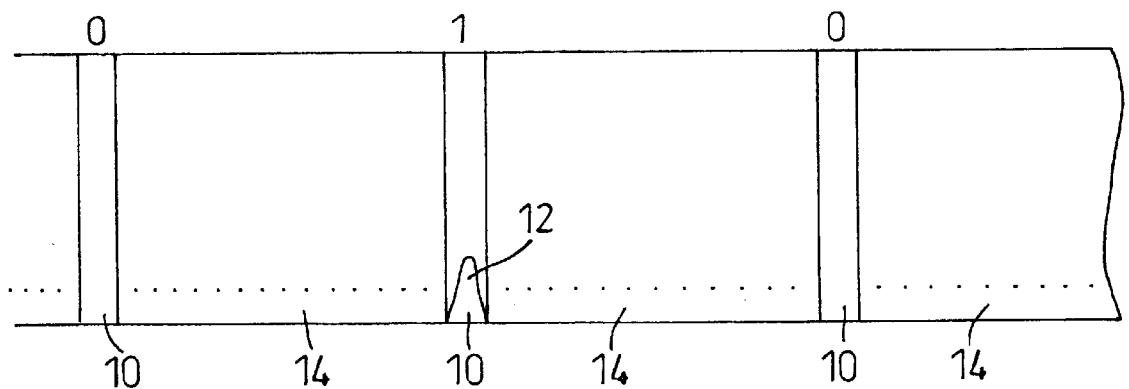
FIG. 3 is a schematic illustration of a data stream in a wavelength division multiplexed channel which is tagged, in accordance with the present invention.

Referring to FIG. 3, there is presented a schematic illustration of a wavelength division multiplexed channel data stream in accordance with the present invention.

A method of tagging individual wavelength division multiplexed channels within a plurality of said channels, comprises the step of creating a tagging tone in the form of an analogue Spectral line tone, by providing a series of regularly spaced time slots 10 substantially throughout each of said tagged channels for receipt of binary tagging pulses 12. The binary tagging pulses 12 in each tagged channel are arranged in a different manner to provide a characteristic tag for each tagged channel.

The periodicity of the tagging pulses 12 is such as to produce the analogue spectral line with a frequency of, typically, several orders of magnitude less than that of the data rate of the channel, and with an effective modulation depth large enough to ensure sufficient good signal to noise ratio at the tag tone detection. Typically effective modulation depth is one percent, in other words the time slots reserved for receipt of a tagging pulse 12 occur at least once in every ten, or once in one hundred time slots 14. The frequency of the analogue spectral line is determined transmitting alternate blocks of tag 'ones' and 'zeroes'. For example, if one tag bit 12 is transmitted every one hundred time slots 14, and a pattern fifty 'ones' followed by fifty 'zero' tag bits is repeated the analogue spectral line will be at one ten thousandth of the channel rate.

There are a number of different ways of modulating this analogue spectral line tone such as frequency modulation or producing a binary channel identifying code, which can be read at the analogue spectral line tone frequency.

For example, the tagging bits may be simply treated as an additional tributary, which is interleaved with the payload data tributaries at the bit interleaving stage. In one embodiment, say, thirty-nine 2.5 Gbps data tributaries plus one tag tributary may be sampled and bit interleaved to make up a 100 Gbps aggregate data stream. In this case the tag tributary is sampled at the same rate as the other data tributaries, but contains relatively low rate data, which provides the tagging spectral tone together with any further coded information imposed upon it.

Alternatively, the modulator periodically interrupts the data stream in order to insert additional time slots for the tagging bits.

The amplitude of the tagging tone can be modulated for example by transmitting either sequential blocks of 'one' and 'zero' tag bits (i.e. analogue spectral line present) or transmitting all ones or all zeroes (i.e. analogue spectral line absent).

The frequency of the analogue spectral line can be modulated by for example sending a repeated pattern of fifty 'one' followed by fifty 'zero' tag bits (to generate the first tag analogue spectral line) or a repeated pattern of fifty-five 'one' followed by fifty-five 'zero' tag bits (to generate a second analogue spectral line close to the first).

The phase of the analogue spectral line can be modulated by for example introducing a block of twenty-five 'one' or 'zero' tag bits into the repeated pattern of fifty 'one' followed by fifty 'zero' tag bits.

Figure 4:
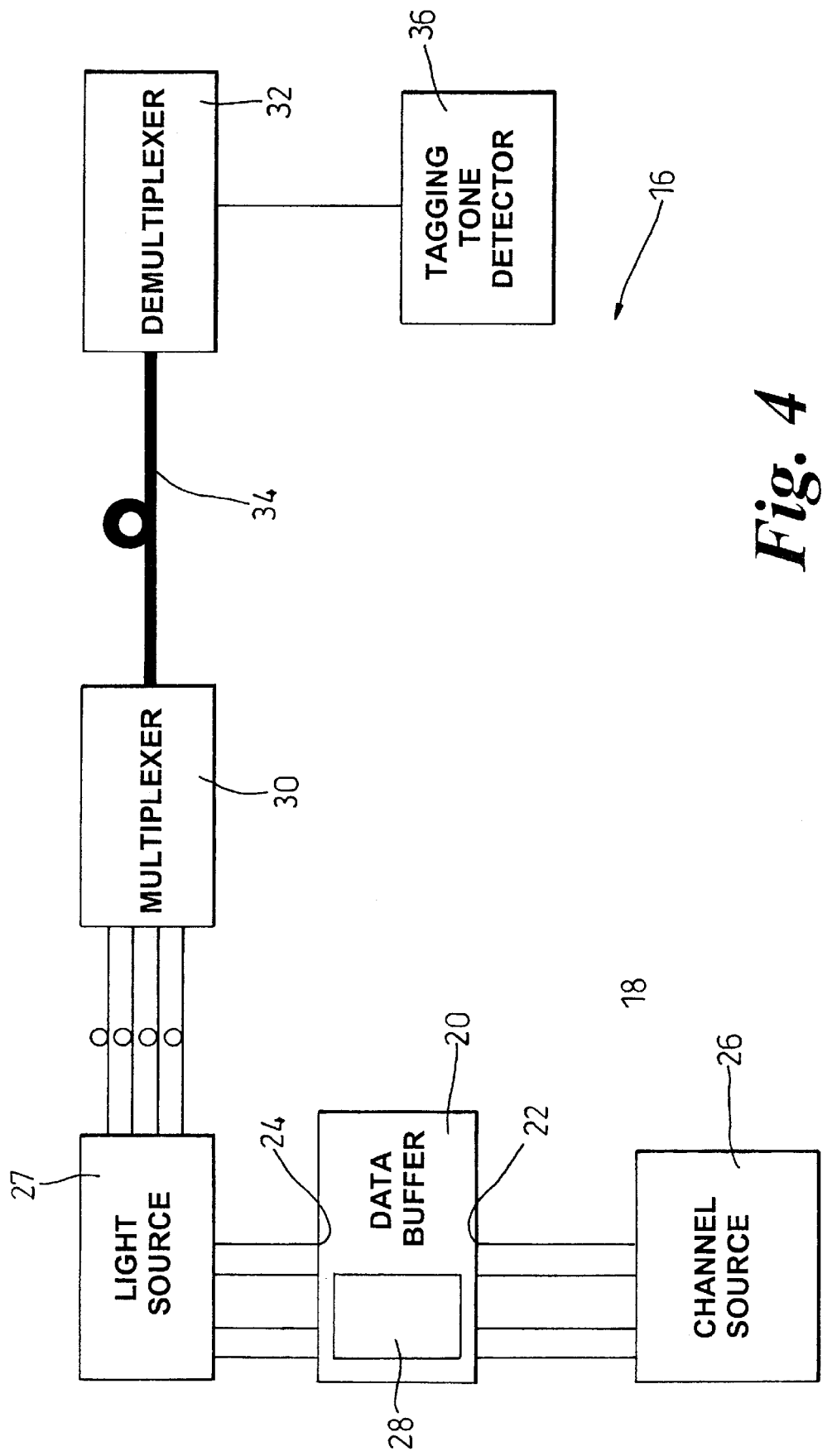
FIG. 4 is a schematic illustration of a communications system in accordance with the present invention.

Referring to FIG. 4 there is presented a schematic representation of an embodiment of a communication system in accordance with the present invention. The communications system 16 comprises an optical communications system comprising an optical transmission system 18 comprising a data buffer 20 which has inputs 22 and outputs 24, the inputs of which are connected to a source 26 of a series of individual untagged electronic channels. The system 16 also includes a light source 27, which is adapted to provide wavelength division multiplexed optical signals for each of the channels. The light source is connected to the outputs 24 of the data buffer 20. The data buffer 20 is adapted to provide a data stream in respect of each channel to be tagged with a series of uniformly spaced time slots 10. Modulation means 28 are also provided, which are adapted to apply a characteristic series of tagging pulses 12 in selected ones of said time slots 10 to produce a tagging tone in each of said tagged channel in the form of an analogue spectral line tone.

The communications system of FIG. 4 further includes a multiplexer 30 and a demultiplexer 32 which are connected via a fibre link 34. This system further includes a tagging tone detector 36 adapted to distinguish individual tagging tones. The form of a detector 36 will be dependent upon the form of modulation used as described above. If frequency modulation is used to distinguish the channels, then a frequency detector incorporating a phase locked loop detector or narrow band amplifier will be utilised. However, if individual channels are identified by identifying codes then correlation electronics will be utilised to detect these codes at the spectral line tone frequency, as discussed above.

The foregoing description has been limited to specific embodiments of the invention. It will be apparent however that variations and modifications may be made to the invention without departing from the scope or spirit of the invention as claimed.

What is claimed is:

1. A method of tagging individual wavelength division multiplexed channels within a plurality of said channels, comprising the step of creating a tagging tone in the form of an analogue spectral line tone, by providing a series of regularly spaced time slots substantially throughout each of said tagged channels for receipt of binary tagging pulses, the binary tagging pulses in each tagged channel being arranged in a different manner to provide a characteristic tag for each tagged channel.

2. The method of claim 1, wherein the periodicity of the tagging pulses in a tagged channel is such as to produce said analogue spectral line with a frequency at least an order of magnitude less than the data rate of data being transmitted within said channel.

3. The method of claim 2, wherein, the data rate of the channel lies in the GHz range and the frequency of the spectral line lies in the MHz range.

4. The method of claim 1, wherein each channel tag is modulated so as to have a different spectral line frequency.

5. The method of claim 1, wherein each tagged channel includes a plurality of tagging pulses which are configured to produce a characteristic binary channel identifying code, which is readable at the analogue spectral line frequency.

6. The method of claim 1, wherein each channel tag is modulated to have a different phase.

7. An optical transmission system comprising:
   a data buffer having inputs and outputs, the inputs of which are connected to a source of a series of individual untagged electronic channels,
   a light source adapted to provide wavelength division multiplexed optical signals for each of said channels, the light source being connected to the outputs of said buffer,
   the data buffer being adapted to provide a data stream in respect of each channel to be tagged with a series of uniformly spaced time slots,
   and modulation means adapted to apply a characteristic series of tagging pulse in selected ones of said time slots to produce a tagging tone in each of said tagged channel in the form of an analogue spectral line tone.

8. The source of claim 7, wherein the modulator interrupts the data stream to insert the time slots.

9. The source of claim 7, wherein the reserved time slots are reserved by treating the tagging bits as an additional low data rate tributary which is interleaved with the payload data tributaries at the bit interleaving stage.

10. The source of claim 7, wherein the modulator is arranged to provide the tagging pulses with a periodicity such that the analogue spectral line has a frequency at least an order of magnitude less than that of the data rate of the channel.

11. The source of claim 7, wherein, the modulator is arranged to modulate each channel tag by changing the frequency of the spectral line tone.

12. The source of claim 7, wherein, the modulator is arranged to produce a characteristic binary channel identifying code, which is readable at the analogue spectral line tone frequency.

13. The source of claim 7, wherein, the modulator is arranged to modulate each channel tag by changing the phase of the analogue spectral line tone on the channel.

14. An optical communications system comprising:
   an optical transmission system comprising: a data buffer having inputs and outputs, the inputs of which are connected to a source of a series of individual untagged electronic channels, a light source adapted to provide wavelength division multiplexed optical signals for each of said channels, the light source being connected to the outputs of said buffer, the data buffer being adapted to provide a data stream in respect of each channel to be tagged with a series of uniformly spaced time slots, and modulation means adapted to apply a characteristic series of tagging pulses in selected ones of said time slots to produce a tagging tone in each of said tagged channel in the form of an analogue spectral line tone;
   a multiplexer and a demultiplexer coupled via a fibre link;
   and a tagging tone detector connected to said demultiplexer and adapted to distinguish individual tagging tones in order to demultiplex said tagged channels.

15. The system of claim 14, wherein, the detector includes correlation electronics adapted to distinguish individual tag identifying codes.

16. A system as claimed in claim 14, wherein the detector is adapted to detect the analogue spectral line frequency of each channel utilising a phase locked loop detector.

17. A system as claimed in claim 14, wherein the detector is adapted to detect the analogue spectral line frequency of each channel utilising a narrow band amplifier.

18. A an optical wavelength division multiplexed channel management system for the management of an optical communications network transmitting a plurality of channels wherein data is transmitted using return to zero pulses, each of said channels being tagged utilising a method comprising the step of creating a tagging tone in the form of an analogue spectral line tone, by providing a series of regularly spaced time slots substantially throughout each of said tagged channels for receipt of binary tagging pulses, the binary tagging pulses in each tagged channel being arranged in a different manner to provide a characteristic tag for each tagged channel.

* * * * *